No. 640,256. Patented Jan. 2, 1900.
E. ATTAWAY.
BEDSTEAD BRACE AND TIGHTENER.
(Application filed Oct. 12, 1899.)
(No Model.)
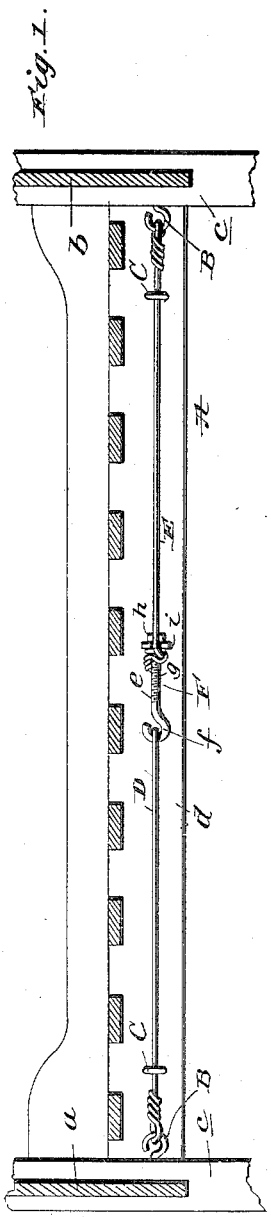
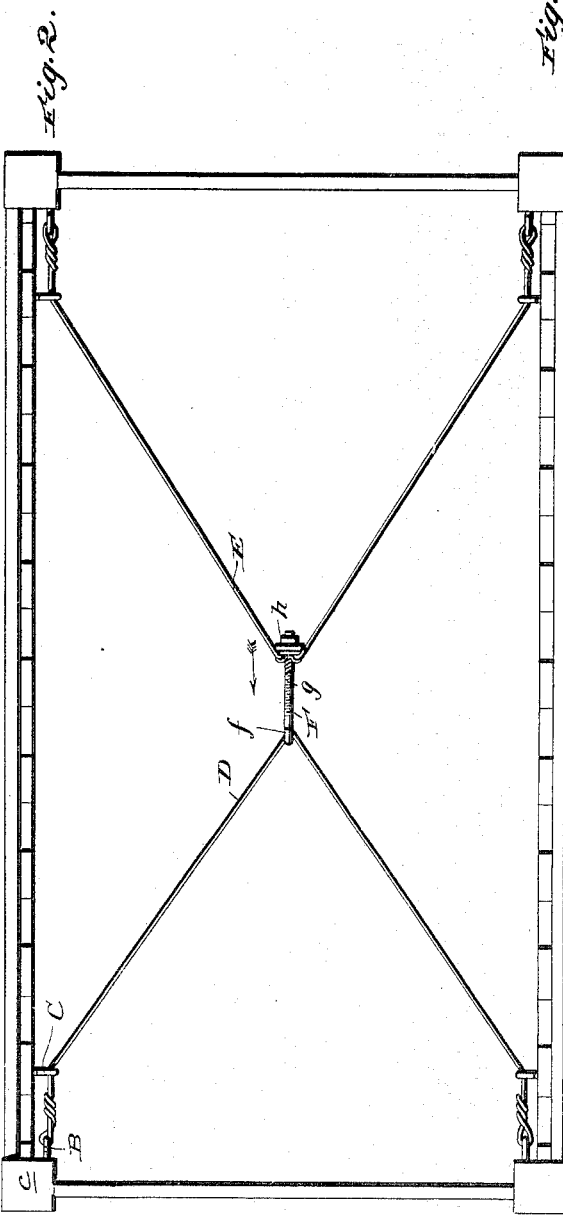
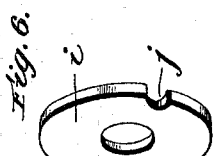
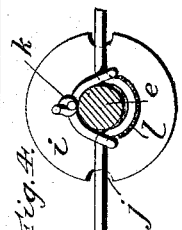
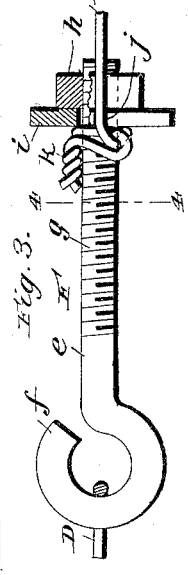
Witnesses:
Inventor
E. Attaway
BY James J Sheehy
Attorney

UNITED STATES PATENT OFFICE.

ELISHA ATTAWAY, OF BUNKIE, LOUISIANA.

BEDSTEAD BRACE AND TIGHTENER.

SPECIFICATION forming part of Letters Patent No. 640,256, dated January 2, 1900.

Application filed October 12, 1899. Serial No. 733,424. (No model.)

*To all whom it may concern:*

Be it known that I, ELISHA ATTAWAY, a citizen of the United States, residing at Bunkie, in the parish of Avoyelles and State of Louisiana, have invented new and useful Improvements in Bedstead Braces and Tighteners, of which the following is a specification.

My invention relates to bedstead braces and tighteners and contemplates the peculiar and advantageous construction hereinafter described, and particularly pointed out in the claim appended.

In the accompanying drawings, Figure 1 is a longitudinal central section of a bedstead equipped with my improved fastener. Fig. 2 is a plan view of the same. Fig. 3 is an enlarged view, partly in elevation and partly in section, illustrating the adjustable connection between the cable-loops. Fig. 4 is a transverse section taken in the plane indicated by line 4 4 of Fig. 3. Fig. 5 is a detail perspective view illustrative of the manner in which one cable-loop is connected to the shank of the bolt forming part of the adjustable connection. Fig. 6 is a perspective view of the washer.

In the said drawings similar letters designate corresponding parts in all of the several views, referring to which—

A is a bedstead, made up of the usual head and foot boards $a$ $b$, corner-posts $c$, and side rails $d$, the latter being detachable from the corner-posts.

B C are hooks screwed into or otherwise connected to the posts $c$ and rails $d$, respectively, at the points shown and in a plane below the slats, with which the bedstead is ordinarily provided.

D E are loops of wire or other cable, which are connected at their ends to the hooks B and are engaged and held by the hooks C after the manner shown, and F is the adjustable connection between the bights or adjacent portions of the loops. This connection comprises a bolt $e$, having a hook $f$ at one end to receive the bight of loop D and also having a threaded shank $g$, a nut $h$, mounted on the bolt, a washer $i$, of suitable shape, loosely mounted on the bolt at the inner side of the nut $h$ and provided at opposite points with notches $j$, and a wire fastener $k$ for loosely securing the bight of the loop E on the shank of the bolt $e$, at the inner side of the washer $i$.

In securing the inner portion of the loop E on the shank of the bolt the bight of said loop is bent at right angles to the shank of the bolt and shaped in conformity to the same, and the divergent portions of the same are placed in the notches $j$ of the washer $i$. The piece of wire forming the fastener $k$ is then passed over the shank of the bolt and looped around the loop E at opposite sides of the bolts, and its ends are twisted, as shown, or otherwise fastened together.

In order to prevent the bight of the loop E from injuring the threads of the bolt incident to its movements lengthwise of the bolt, I provide the said bight with a covering $l$, of cloth, rubber, or other suitable material, which is interposed between it and the bolt, as best shown in Fig. 4.

In the practical operation of my improved brace and tightener when it is desired to take up looseness of the bedstead and render the same stiff and rigid it is simply necessary for the operator to turn the nut $h$, so as to move it in the direction indicated by arrow in Fig. 2 on the bolt. When this is done, the washer $i$ and the bight of loop E will be moved before the nut and all slack of the loops E and F will be taken up. On the other hand, when it is desired to loosen the loops E and disconnect the same from the bedstead, so as to permit of the same being taken apart, the operator has but to turn the nut, so as to move it in the direction opposite to that indicated by arrow to the extent desired.

It will be appreciated from the foregoing that my improved brace and tightener is readily applicable to old as well as new bedsteads, and through its agency a bedstead may be quickly and easily rendered stiff and rigid and kept so. It will also be appreciated that the device is extremely simple and inexpensive in construction, and the cost entailed in applying it to a beadstead is immaterial.

I have entered into a specific description of the construction and relative arrangement of the brace and tightener in order to impart a full, clear, and exact understanding of the same. I do not desire, however, to be understood as confining myself to such specific construction and arrangement of parts, as such changes or modifications may be made in practice as fairly fall within the scope of my invention.

Having thus described my invention, what I claim is—

The combination with a bedstead having corner-posts and side rails; of a brace and tightener comprising a cable-loop connected at its ends to one pair of corner-posts and at an intermediate point of its length to the side rails, a threaded bolt connected to the bight of the cable-loop, a nut mounted on said bolt, a washer loosely arranged on the bolt at the inner side of the nut and having notches in its edge at opposite points, a second cable-loop connected at its ends to the other pair of corner-posts and at intermediate points of its length to the side rails and having its bight arranged at the inner side of the washer and adjacent to the bolt and also having its divergent portions seated in the notches of said washers, and a wire fastener loosely securing the bight of the said loop on the bolt at the inner side of the washer, substantially as and for the purpose set forth.

In testimony whereof I have hereunto set my hand in presence of two subscribing witnesses.

ELISHA ATTAWAY.

Witnesses:
 ROSS E. BREAZEALE,
 J. D. AARON.